(12) United States Patent
Chavez et al.

(10) Patent No.: US 10,689,106 B2
(45) Date of Patent: Jun. 23, 2020

(54) FIXED OUTBOARD ENGINE TILTROTOR WITH LEADING EDGE DRIVE SYSTEM AND ANGLED ROTATION SPINDLE CONFIGURATION

(71) Applicant: Bell Helicopter Textron Inc., Fort Worth, TX (US)

(72) Inventors: Jeremy Chavez, Colleyville, TX (US); Brent Chadwick Ross, Flower Mound, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 481 days.

(21) Appl. No.: 15/642,525

(22) Filed: Jul. 6, 2017

(65) Prior Publication Data

US 2019/0009900 A1 Jan. 10, 2019

(51) Int. Cl.
*B64C 27/52* (2006.01)
*B64C 29/00* (2006.01)
*B64C 27/26* (2006.01)
*B64C 27/12* (2006.01)

(52) U.S. Cl.
CPC .......... *B64C 29/0033* (2013.01); *B64C 27/26* (2013.01); *B64C 27/12* (2013.01); *B64C 27/52* (2013.01)

(58) Field of Classification Search
CPC .............................. B64C 29/0033; B64C 27/52
See application file for complete search history.

(56) References Cited

U.S. PATENT DOCUMENTS

| 3,081,964 A | * | 3/1963 | Quenzler | ............ B64C 29/0033 244/7 R |
| 3,089,666 A | * | 5/1963 | Quenzler | ............ B64C 29/0033 244/7 R |
| 3,592,412 A | * | 7/1971 | Glatfelter | ............ B64C 29/0033 244/7 A |
| 6,276,633 B1 | | 8/2001 | Balayn et al. | |

(Continued)

FOREIGN PATENT DOCUMENTS

WO 2003089145 A2 10/2003

OTHER PUBLICATIONS

European Patent Office, Communication pursuant to Article 94(3) EPC for EP Appl. No. 17185823.6 dated Mar. 6, 2018, 7 pp.

(Continued)

*Primary Examiner* — Brian M O'Hara
(74) *Attorney, Agent, or Firm* — Edwin S. Flores; Daniel J. Chalker; Chalker Flores, LLP (57) ABSTRACT

The present invention includes a rotorcraft drive system comprising: an engine positioned at an end of a wing between a mid-wing spar and an aft-wing spar; a spindle positioned forward from the engine, the spindle capable of rotation between a hover and forward flight position, wherein the spindle rotates about a rotation bearing on an inboard split rib and an outboard tip rib or in a cantilevered spindle configuration supported by the inboard tip rib; and a tilt axis driveshaft connected to the engine, wherein the tilt axis drive shaft connects to a plurality of gears and shafts that transmit power from the engine to a proprotor gear box when the spindle is in: a forward position, a hover position, and during a transition between the forward position and the hover position without loss of power to the proprotor gear box.

23 Claims, 10 Drawing Sheets

(56) References Cited

U.S. PATENT DOCUMENTS

| | | |
|---|---|---|
| 9,126,678 B2 | 9/2015 | Ross et al. |
| 9,174,731 B2 | 11/2015 | Ross et al. |
| 9,694,911 B2* | 7/2017 | Bevirt .................... B64C 11/28 |
| 2012/0283029 A1* | 11/2012 | Lawrie .................... F16D 3/725 |
| | | 464/88 |
| 2014/0263855 A1 | 9/2014 | Ross et al. |

OTHER PUBLICATIONS

European Patent Office, Communication pursuant to Article 94(3) EPC for EP Appl. No. 17185823.6 dated Sep. 3, 2018, 4 pp.
European Patent Office, European Search Report for EP Appl. No. 17185823.6 dated Feb. 20, 2018, 4 pp.

* cited by examiner

FIXED OUTBOARD ENGINE TILTROTOR WITH LEADING EDGE DRIVE SYSTEM AND ANGLED ROTATION SPINDLE CONFIGURATION

CROSS-REFERENCE TO RELATED APPLICATIONS

Not Applicable.

STATEMENT OF FEDERALLY FUNDED RESEARCH

Not Applicable.

TECHNICAL FIELD OF THE INVENTION

The present invention relates in general to the field of drive systems, and more particularly, to a fixed outboard engine tiltrotor with leading edge drive system and angled rotation spindle configuration.

BACKGROUND OF THE INVENTION

Without limiting the scope of the invention, its background is described in connection with rotorcraft drive systems.

U.S. Pat. No. 9,126,678, issued to Ross, et al., is entitled "Spindle mounted tiltrotor pylon with fixed engine arrangement", and teaches a rotor system for tilt rotor aircraft that comprises an engine disposed at a first fixed location on a wing member; a prop-rotor pylon mechanically coupled to the engine along a drive path, and a gearbox disposed in the drive path. The prop-rotor pylon is rotatably mounted on a spindle gearbox, and the prop-rotor pylon is configured to selectively rotate about a rotational axis of the spindle gearbox between a vertical position and a horizontal position. The gearbox comprises a rotational axis aligned with the rotational axis of the spindle gearbox.

U.S. Pat. No. 9,174,731, issued Ross, et al., entitled "Fixed engine and rotating proprotor arrangement for a tiltrotor aircraft", and teaches a tiltrotor aircraft that includes a fuselage; a wing member having a first rib, a second rib, a first spar, second spar; and an upper wing skin; an engine disposed at a fixed location relative to the wing member; and a proprotor having a spindle gearbox, rotor mast, and a plurality of rotor blades drivable in rotation about the rotor mast, the spindle gearbox being rotatable about a conversion axis. The spindle gearbox is located above the upper wing skin of the wing member.

SUMMARY OF THE INVENTION

In one embodiment, the present invention includes a rotorcraft drive system comprising: a fixed engine positioned at an end of a wing member between a mid-wing spar and an aft-wing spar, wherein a center of gravity of the fixed engine is forward from the aft-wing spar; a spindle gearbox sometimes referred to in this document as merely "the spindle" positioned forward from the engine, the spindle gearbox capable of rotation between a hover and forward flight position and transmitting the rotor loads into the wing, wherein the spindle gearbox rotates about a rotation bearing on an inboard split rib and an outboard tip rib; an interconnect drive shaft connected to the fixed engine, wherein the interconnect drive shaft passes through the wing member between a forward wing spar and a mid-wing spar of the wing member; and a tilt axis driveshaft connected to the engine, wherein the tilt axis drive shaft connects to a plurality of gears and shafts that transmit power from the engine to a proprotor gear box when the spindle is in: a forward position, a hover position, and during a transition between the forward position and the hover position without loss of power to the proprotor gear box. In one alternative embodiment, the spindle gearbox is supported by a combination of bearings in further inboard ribs that support combinations, e.g., partial or complete trunnions, supported at the tip rib and split rib, or a cantilevered support where the structural elements of the spindle extend inboard with support bearings at inboard rib and the split rib, or even a redundant option where the spindle gearbox is supported by more than two bearings at a combination of locations including ribs, the split rib, and the outboard tip rib. In one aspect, the tilt axis driveshaft connects to the engine by a bevel gear. In another aspect, the tilt axis driveshaft connects to the gears and shafts in the spindle by a bevel gear. In another aspect, the tilt axis driveshaft further comprises a gear at an inboard end that connects to an interconnect drive shaft through a bevel gear located within the spindle, wherein the spindle is angled. In another aspect, the plurality of gears and shafts that transmit power from the engine to a proprotor gear box further comprise an aft beveled gear that connects to a shaft that transmits power to a reducer gear connected to a proprotor input shaft that connects to the proprotor gear box. In another aspect, the inboard split rib and an outboard tip rib form a cradle that supports the engine. In another aspect, the shafts are composite shafts. In another aspect, the rotorcraft drive system further comprises a proprotor connected to the proprotor gearbox. In another aspect, the rotation of the spindle allows structural continuity for rotor loads in the primary structure. In another aspect, the interconnect drive shaft is positioned behind the forward wing spar.

In another embodiment, the present invention includes a method for transitioning a rotorcraft between a hover and forward flight mode comprising: positioning a fixed engine at an end of a wing between a mid-wing spar and an aft-wing spar, wherein a center of gravity of the fixed engine is forward from the aft-wing spar; providing a spindle positioned forward from the engine, the spindle capable of rotation between a hover and forward flight position, wherein the spindle rotates about a rotation bearing on an inboard split rib and an outboard tip rib; positioning an interconnect drive shaft connected to the fixed engine, wherein the interconnect drive shaft passes through the wing member between a forward wing spar and a mid-wing spar of the wing member; and connecting a tilt axis driveshaft connected to the engine, wherein the tilt axis drive shaft connects to a plurality of gears and shafts that transmit power from the engine to a proprotor gear box when the spindle is in a forward position, a hover position, and during the transition between the forward and hover positions without loss of power to the proprotor gear box. In one aspect, the method further comprises connecting the tilt axis driveshaft to the engine by a bevel gear. In another aspect, the method further comprises connecting the tilt axis driveshaft to the gears and shafts in the spindle by a bevel gear. In another aspect, the method further comprises connecting the tilt axis driveshaft that further comprises a gear at an inboard end to an interconnect drive shaft through a bevel gear located within an angled spindle. In another aspect, the method further comprises connecting the plurality of gears and shafts that transmit power from the engine to a proprotor gear box that comprise an aft beveled gear to a shaft that transmits power to a reducer gear connected to a proprotor input shaft that is connected to the proprotor gear box. In another aspect, the inboard split rib and an outboard tip rib form a cradle that supports the engine. In another aspect, the shafts are composite shafts. In another aspect, the method further comprises connecting a proprotor to the proprotor gearbox. In another aspect, the rotation of the spindle allows structural continuity for rotor loads in the primary structure.

Yet another embodiment of the present invention includes an aircraft comprising: a fuselage connected to a wing member; a fixed engine positioned at an end of the wing member between a mid-wing spar and an aft-wing spar, wherein a center of gravity of the fixed engine is forward from the aft-wing spar; a spindle positioned forward from the engine, the spindle capable of rotation between a hover and forward flight position, wherein the spindle rotates about a rotation bearing on an inboard split rib and an outboard tip rib; an interconnect drive shaft connected to the fixed engine, wherein the interconnect drive shaft passes through the wing member between a forward wing spar and a mid-wing spar of the wing member; and a tilt axis driveshaft connected to the engine, wherein the tilt axis drive shaft connects to a plurality of gears and shafts that transmit power from the engine to a proprotor gear box when the spindle is in: a forward position, a hover position, and during a transition between the forward position and the hover position without loss of power to the proprotor gear box. In one aspect, the tilt axis driveshaft connects to the engine by a bevel gear, connects to the gears and shafts in the spindle by a bevel gear, and connects at an inboard end with a bevel gear located within the angled spindle. In another aspect, the plurality of gears and shafts that transmit power from the engine to a proprotor gear box further comprise an aft beveled gear that connects to a shaft that transmits power to a reducer gear connected to a proprotor input shaft that connects to the proprotor gear box. In another aspect, the wings are swept wings.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Unless otherwise specified, use of the terms "connect," "engage," "couple," "attach," or any other like term describing an interaction between elements is not meant to limit the interaction to direct interaction between the elements and may also include indirect interaction between the elements described. In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes an engine and pylon arrangement for a tilt rotor aircraft in which the engine is fixed in relation to a wing portion of the aircraft, while the pylon is rotatable about a spindle or trunnion. The pylon supports a rotor hub having a plurality of rotor blades. Rotation of the pylon allows the aircraft to selectively fly in a helicopter mode and an airplane mode, as well as at any position there between. The engine may be coupled to the rotor hub through a series of gears. The gearing arrangement may be such that the axis of rotation of the pylon about the spindle is aligned with an axis of rotation of a gearbox between the engine and the rotor hub. A separate interconnect drive shaft may also be mechanically coupled to the rotor hub, and the interconnect drive shaft may similarly be coupled to a gearbox having an axis of rotation aligned with the axis of rotation of the pylon about the spindle. Further, the drive paths from the engine to the prop-rotor gearbox in the prop-rotor pylon and from the interconnect drive shaft to the prop-rotor gearbox may each be independent, thereby providing for an added level of safety and redundancy in providing power to the rotor hub.

The present invention locates a fixed outboard engine between a mid-wing and aft wing structural spar and utilizes an angled rotation spindle joined at two or more structural rib locations with bearings to allow rotation between the aforementioned ribs. The spindle structure encloses a spiral bevel gear set that redirects the power from the tilt axis driveshaft to the leading edge interconnect drive shaft. The interconnect drive shaft is positioned between a forward wing spar and the mid-wing spar, for example, immediately aft of the forward wing spar.

The drive system has a fixed outboard engine with the front of the engine located at the approximate 50% chord of the wing. Power from the engine is transmitted to the tilt axis driveshaft by a helical gear train. The tilt axis driveshaft will transmit power to the proprotor gear box and provide a rotation point via a spiral bevel gear located at approximately the midpoint between the engine input and the interconnect driveshaft output. The tilt axis drive shaft also transmits power to the interconnect drive shaft at the inboard end through a bevel gear train located within the angled spindle.

The wing structure configuration includes an inboard split rib and an outboard tip rib that provides as structural support for the tilting proprotor gear box, spindle and nacelle. Both the inboard split rib and outboard tip rib are secured to the mid and aft wing spars with fasteners. The inboard end of the angled spindle terminates between the forward and mid wing spars at a wing rib location. This configuration allows for the rotation of the spindle between the split rib and outboard tip rib while allowing structural continuity for rotor loads into primary structure. The engine is supported directly by the mid and aft spars by virtue of a structural cradle configuration. The spindle can terminate at the inboard split rib supported in a trunnion arrangement between the inboard split rib and the outboard tip rib, or it can extend further inboard to additional rib supported whole or partly in a cantilevered arrangement from inboard bearings.

This configuration allows for a leading edge drive shaft to be mounted in the wing while maintaining good structural integrity. Further, the spindle support structure can integrate a prop-rotor down-stop and/or a prop-rotor up-stop for engaging and retaining the prop-rotor in the airplane mode or helicopter mode, respectively. The down-stop and/or up-stop may be useful in retaining the prop-rotor pylon in position while relieving stresses on the rotational components and/or the actuator(s).

The outboard placement of the engine minimizes the aerodynamic fairing protruding beneath the lower wing surface. Also a leading edge drive shaft allows the engine to be placed in an advantageous station line. This eliminates the need to cantilever most of the engine aft of the trailing edge which results in a less than optimal structural engine support and aerodynamic faring both of which would contribute to overall aircraft performance penalties. Also, the drive system and angled spindle can be configured to accommodate a wide range of wing sweep angles, which allows this design to be incorporated in various aircraft such as V-22, AW609, Eagle Eye UAV, etc.

As such, the present invention locates a fixed outboard engine in conjunction with a leading edge drive shaft to improve structural weight and recover hover and cruise performance that is lost in other fixed outboard engine configurations. The spindle arrangement allows for a wing sweep angled drive shaft to transition to a rotation axis drive shaft while maintaining structural integrity for proprotor loads. While illustrated as being located at the wing tip, it should be appreciated that the wing tip portion of wing member can be lengthened to customize an aspect ratio of wing member in accordance with implementation specific requirements (e.g., aerodynamic lift requirements). As such, it should be understood that even though fixed engine is illustrated approximately abutting the wing tip portion of wing member, in some embodiments, the fixed engine may include the wing tip portion extending beyond the fixed engine. Also, one or more accessory input drives may be optionally coupled to the engine. The accessory input drives may be used to drive auxiliary equipment such as one or more pumps (e.g., a hydraulic pump, a coolant pump, etc.), blowers, electrical generators, and the like. Each accessory input drive may be located and mesh with a gear at a suitable reduction stage to provide the appropriate input speed to the accessory, while also taking into account space considerations at the fixed engine and the engine nacelle.

Figure 1:
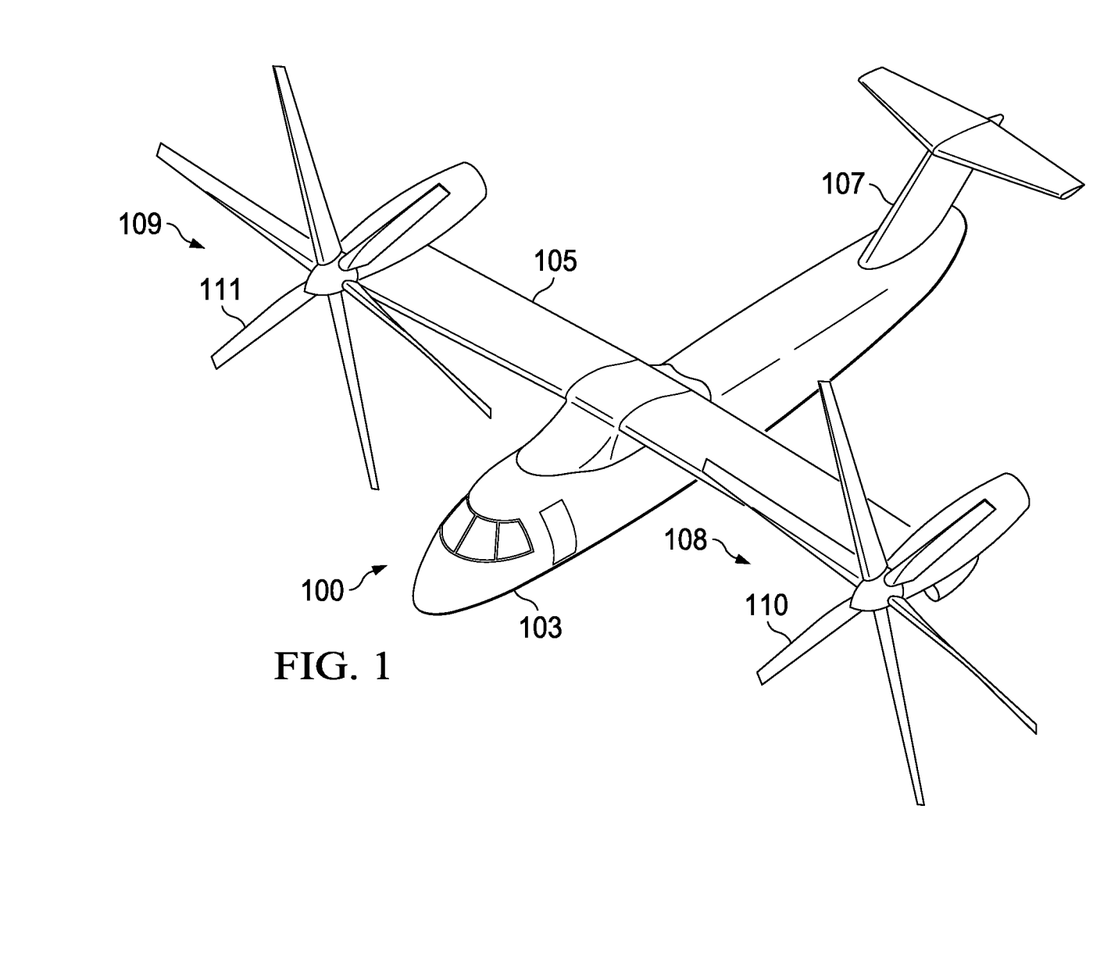
FIG. 1 shows a perspective view of tiltrotor aircraft according to one embodiment of the present invention.

FIG. 1 shows a tilt rotor aircraft 100. In one embodiment the tilt rotor aircraft 100 comprises a fuselage 103, a wing member 105, and a tail member 107. While described as a single wing member 105, it is to be understood that the wing member may be formed from separate components such that two or more wing members are coupled to the fuselage 103 (e.g., each side of the fuselage may comprise a separate wing member). The aircraft 100 may also include a first rotor system 108 and a second rotor system 109. The first rotor system 108 is located on an end portion of a first side of the wing member 105, while second rotor system 109 is located an end portion of a second side of the wing member 105. The first rotor system 108 and second rotor system 109 are substantially symmetric of each other about the fuselage 103. The first rotor system 108 and the second rotor system 109 each include a plurality of rotor blades 110 and 111 coupled to a rotor hub, respectively. In the interest of clarity, only the first rotor system 108 will be discussed in detail in the following description. However, it should be understood that the form and function of the second rotor system 109 can be fully understood from the description of the first rotor system 108 described herein.

While FIG. 1 illustrates the rotor systems 108, 109 in the context of a tilt-rotor aircraft, it should be understood that the first rotor system 108 and the second rotor system 109 can be implemented on other tilt rotor aircraft. For example, an alternative embodiment may include a quad tilt rotor aircraft that has an additional wing member located aft of wing member 105, the additional wing member can have additional rotor systems similar to first rotor system 108 and the second rotor system 109. In some embodiments, the rotor systems 108, 109 can be used with an unmanned version of a tilt rotor aircraft 100. Further, the first rotor system 108 and/or the second rotor system 109 can be integrated into a variety of tilt rotor aircraft configurations.

Figure 2:
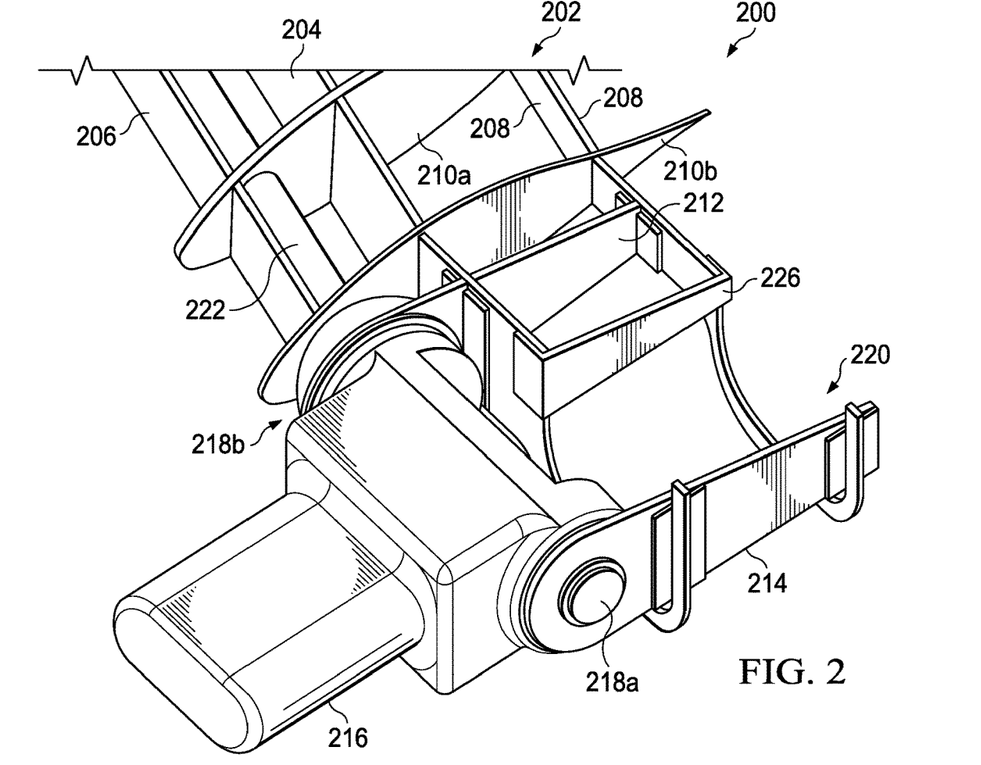
FIG. 2 shows an isometric view of the drive system of the present invention.

FIG. 2 is an isometric view of the drive system 200 of the present invention. The end of a wing 202 is depicted that shows the internal components of the wing 202, specifically, a mid-wing spar 204, a forward wing spar 206, and an aft wing spar 208, which are connected via a plurality of ribs 210a, 210b. The drive system 200 of the present invention includes an inboard split rib 212 and an outboard tip rib 214, which together support the spindle gearbox 216 that rotates about rotation bearings 218a, 218b. A cradle 220 is formed by the ends of the mid-wing spar 204 and the aft wing spar 208, and the inboard split rib 212 and an outboard tip rib 214. The cradle 220 that provides support for the tilting proprotor gearbox, spindle 216, and a fixed engine inside an engine nacelle (not depicted). An end cap rib 226 is also depicted. An interconnect drive shaft 222 connects the port and starboard engines and is depicted in this configuration between the mid-wing spar 204 and the forward wing spar 206. In certain embodiments, the interconnect drive shaft 222 is positioned directly aft from the forward wing spar 206. If the wing member 105 is a swept wing, the interconnect drive shaft 222 will connected via a canted or angled gear system, however, if the wing is straight (that is, perpendicular to the longitudinal axis of the rotorcraft), more simple gearing is possible as a result of the engine being fixed.

Figure 3A:
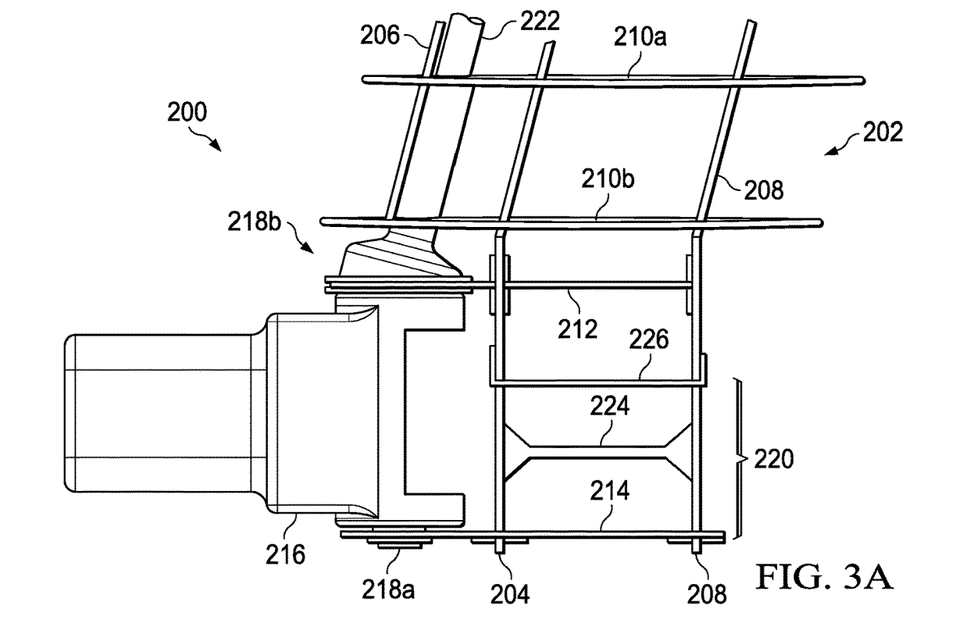
FIG. 3A shows a top view of the drive system of the present invention.

FIG. 3A is a top view of the drive system 200 of the present invention. The end of a wing 202 is depicted that shows the internal components of the wing 202, specifically, a mid-wing spar 204, a forward wing spar 206, and an aft wing spar 208, which are connected via a plurality of ribs 210a, 210b. The drive system 200 of the present invention includes an inboard split rib 212 and an outboard tip rib 214, which together support the spindle 216 that rotates about rotation bearings 218a, 218b. The cradle 220 is formed by the ends of the mid-wing spar 204 and the aft wing spar 208, and the inboard split rib 212 and an outboard tip rib 214, and is shown with a reinforcing rib 224 and an end cap rib 226. The interconnect drive shaft 222 connects the port and starboard engines and is depicted in this configuration between the mid-wing spar 204 and the forward wing spar 206. In certain embodiments, the interconnect drive shaft 222 is positioned directly aft from the forward wing spar 206. The cradle 220 that provides support for the tilting proprotor gear box, spindle 216, and nacelle (not depicted). An interconnect drive shaft 222 connects the port and starboard engines and is depicted in this configuration between the mid-wing spar 204 and the forward wing spar 206.

Figure 3B:
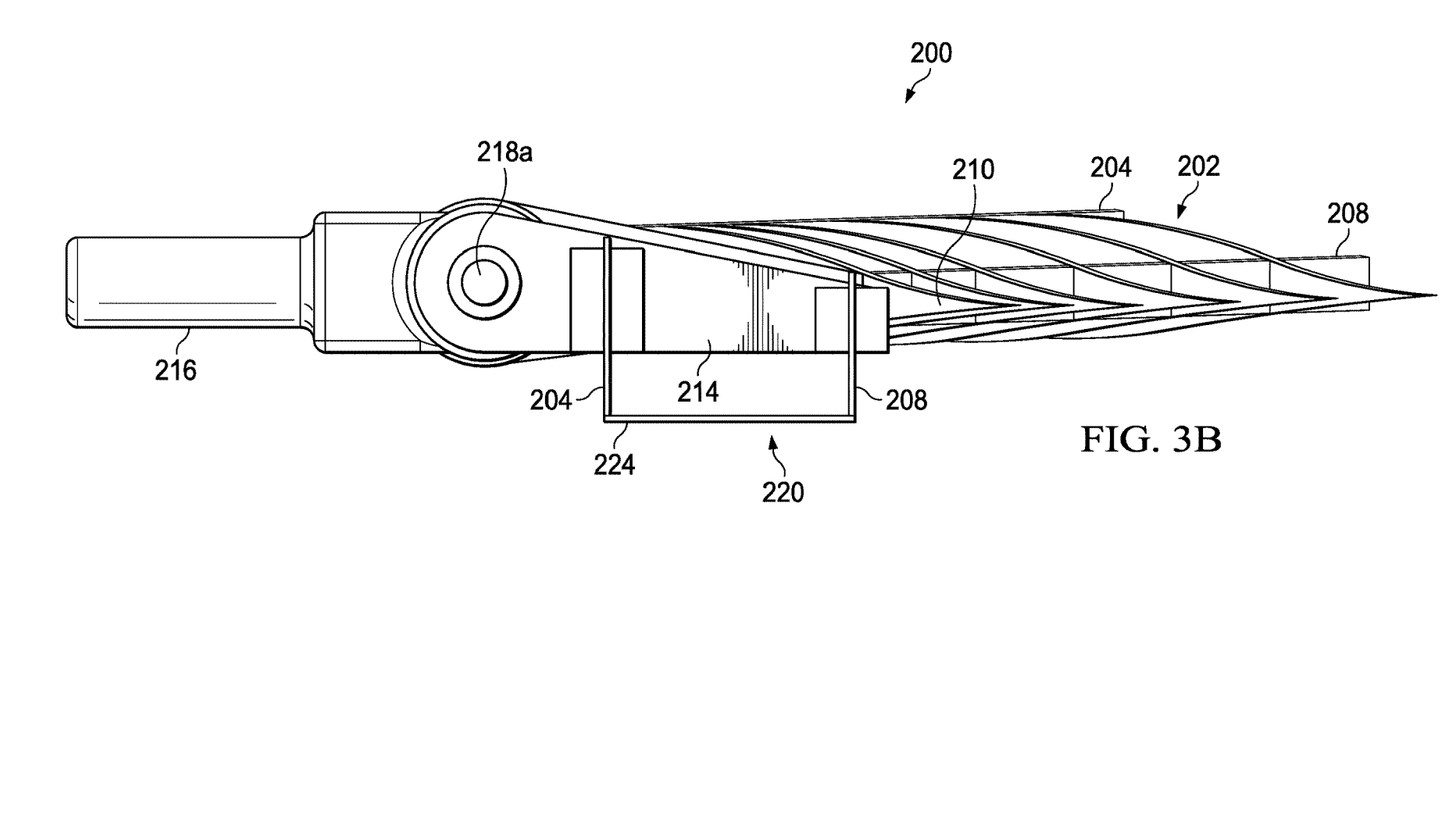
FIG. 3B shows a side view of the drive system of the present invention.

FIG. 3B is a side view of the drive system 200 of the present invention. The end of a wing 202 is depicted that shows the internal components of the wing 202, specifically, a mid-wing spar 204, and an aft wing spar 208, which are connected via a plurality of ribs 210. The outboard tip rib 214 is shown in relation to the spindle 216 that rotates about rotation bearings 218a, 218b. The cradle 220 is show as including the ends of the mid-wing spar 204 and the aft wing spar 208, and the outboard tip rib 214. The ends of the mid-wing spar 204 and the aft wing spar 208 extend downward and are connected by reinforcing rib 224. The cradle 220 that provides support for the tilting proprotor gear box, spindle 216, and nacelle (not depicted).

Figure 4A:
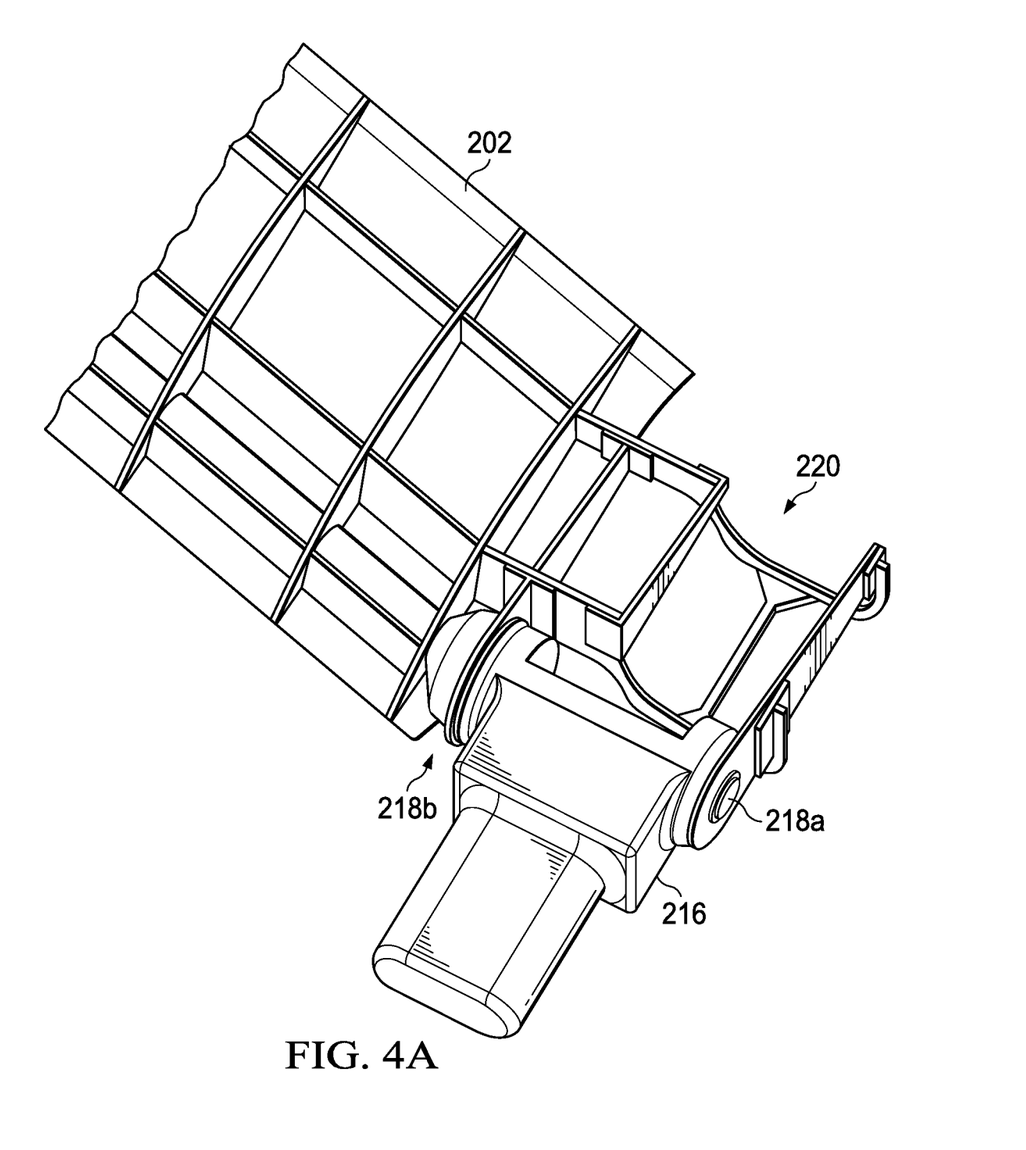
FIG. 4A shows the spindle in a forward position in relation to the wing.

FIG. 4A shows the spindle 216 in a forward position in relation to the wing 202 and the cradle 220 that is in the forward position and pivots or rotates about rotation bearings 218a, 218b. When the spindle 216 is in the forward position the thrust from the rotor propels the rotorcraft forward and the tiltrotor aircraft flies like a conventional propeller driven aircraft.

Figure 4B:
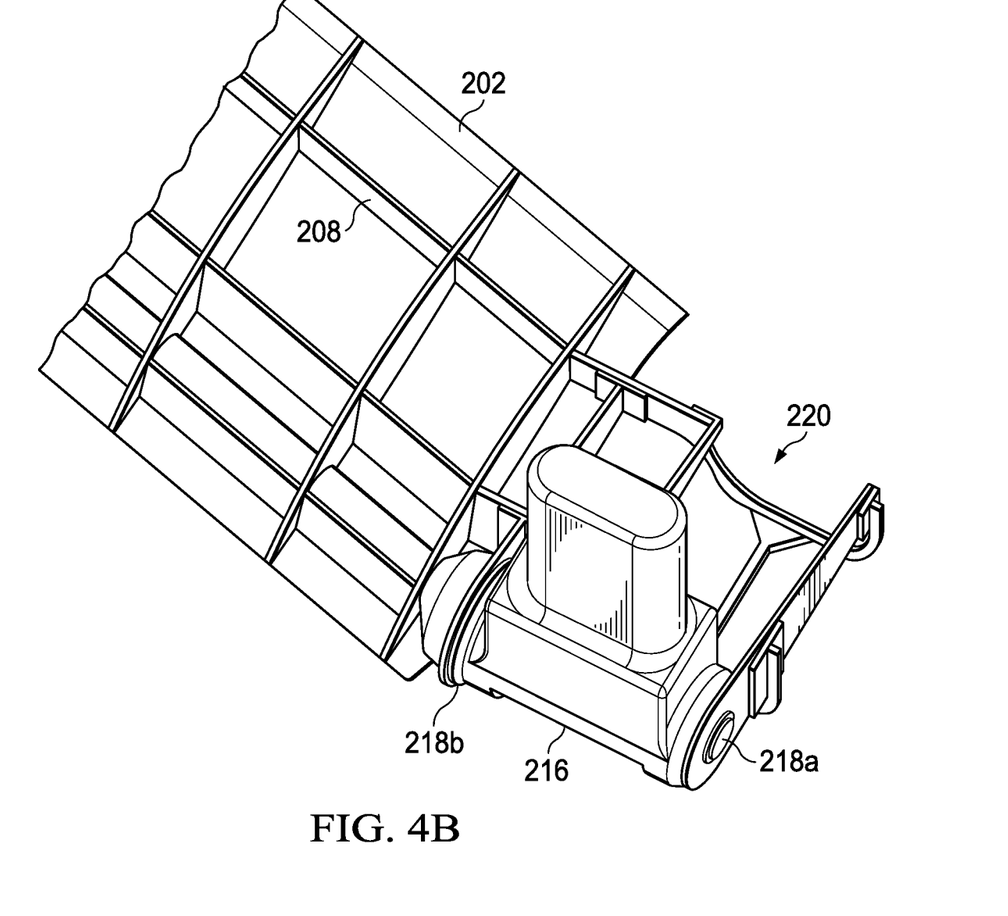
FIG. 4B shows the spindle in an upward position in relation to the wing.

FIG. 4B shows the spindle 216 in a forward position in relation to the wing 202 and the cradle 220 that is in the upward position and pivots or rotates about rotation bearings 218a, 218b. When the spindle 216 is in the upward position the thrust from the rotor propels the rotorcraft upward, and the tiltrotor aircraft flies like a conventional helicopter, such as hover and flight operations. During the transition between the upward and forward position, the aircraft transitions between a helicopter or hover mode and cruise mode in which on the rotors are tilted forward.

Figure 5A:
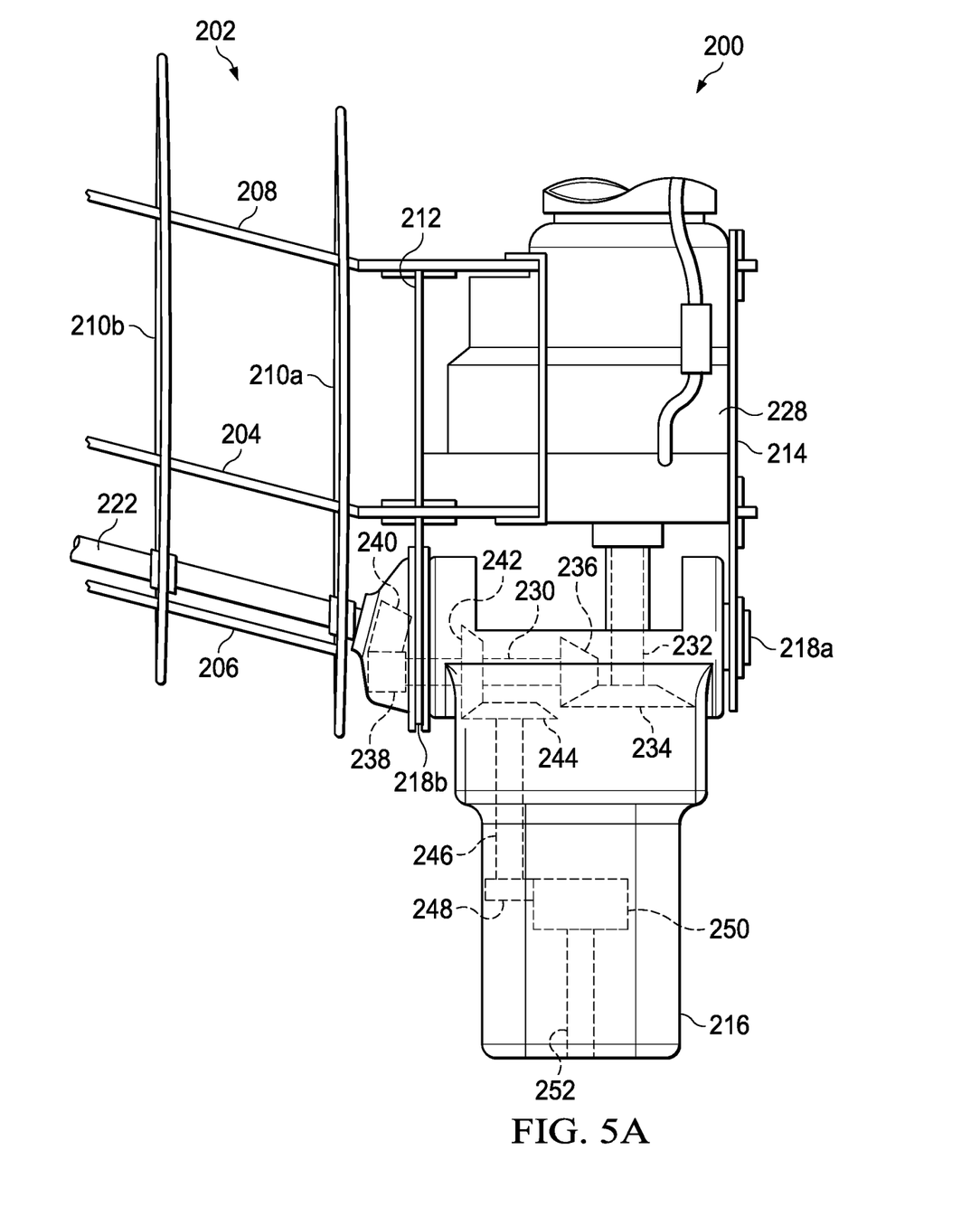
FIG. 5A shows a detailed, cross-sectional view of the drive system of the present invention.

FIG. 5A shows a detailed, cross-sectional view of one embodiment of the drive system 200 of the present invention. The end of a wing 202 is depicted that shows the internal components of the wing 202, specifically, a mid-wing spar 204, a forward wing spar 206, and an aft wing spar 208, which are connected via a plurality of ribs 210a, 210b. The interior gear mechanism of the spindle gearbox 216 rotates about rotational bearings 218a, 218b that are depicted on inboard split rib 212 and outboard tip rib 214. Spindle 216 is depicted and includes a tilt axis shaft 230 that is connected to the engine output shaft 232 from the engine 228 via gears 234, 236, depicted herein as bevel gears. The tilt axis shaft 230 connected to gears 238, 240, which transfer power from the engine 228 to the interconnect drive shaft 222. The tilt axis shaft 230, via gear 242, connects the output from the engine 228 to the gears (244, 248, 250) and shaft 246 within the spindle 216 that drive the proprotor input shaft 252 that connects to the rotor (not depicted). The interconnect drive shaft 222 connects the port and starboard engines and is depicted in this configuration between the mid-wing spar 204 and the forward wing spar 206. In certain embodiments, the interconnect drive shaft 222 is positioned directly aft from the forward wing spar 206. The type of gear and shaft can be selected to optimize the change in speed between the engine 228 and the proprotor input shaft 252, including reducing the total number of gears. The gearing system in the figures is exemplary, and the skilled artisan will recognize that changes may be made to the shape, number and size of the gears while still being within the present invention.

Figure 5B:
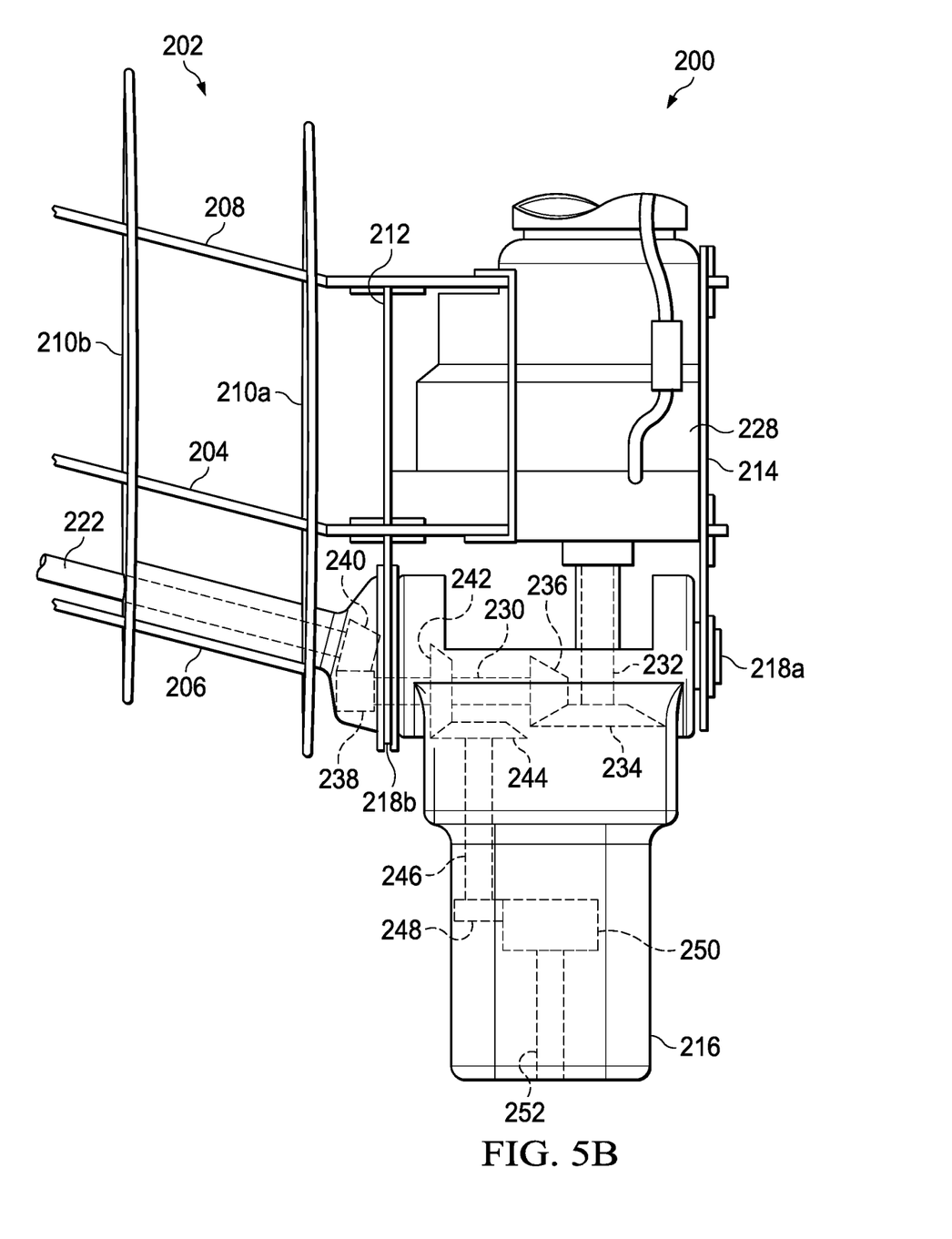
FIG. 5B shows another detailed, cross-sectional view of the drive system of the present invention.

FIG. 5B shows another embodiment of the spindle body of the drive system 200 of the present invention. The end of a wing 202 is depicted that shows the internal components of the wing 202, specifically, a mid-wing spar 204, a forward wing spar 206, and an aft wing spar 208, which are connected via a plurality of ribs 210a, 210b. In a trunnion arrangement, the spindle 216 is supported by bearings at the outboard tip rib 214 and inboard split rib 212. The inboard extension of the spindle includes a gearbox at the inboard split rib 212, and a bearing on the rib 210b and optionally a bearing on rib 210a.

In a more traditional spindle arrangement, the spindle 216 is cantilevered from bearings buried in the ribs 210b and 210a of the wing 202 or the inboard split rib 212. Another embodiment includes a redundant bearing arrangement with more than two (2) bearings supported at a combination of ribs 210a, 210b, the inboard split rib 212 and the outboard tip rib 214. This provides redundancy and options for more load-sharing in the wing 202 structure. It is also desirable to insure movement of the pylon spindle and engine 228 is coordinated so inclusion of the outboard tip rib 214 bearing attachment may be desirable even when utilizing a cantilevered bearing arrangement for primary support.

Figure 6A:
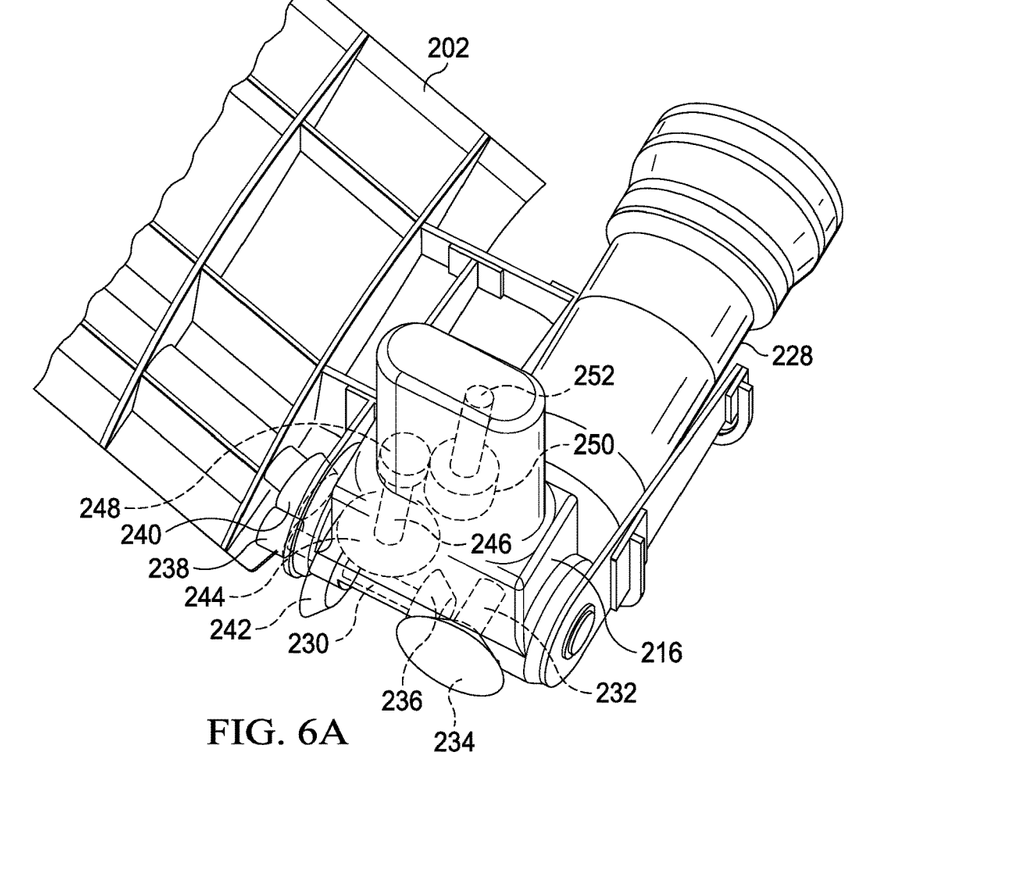
FIG. 6A shows an isometric view of the wing when the position of the spindle of the rotorcraft is in helicopter mode.
Figure 6B:
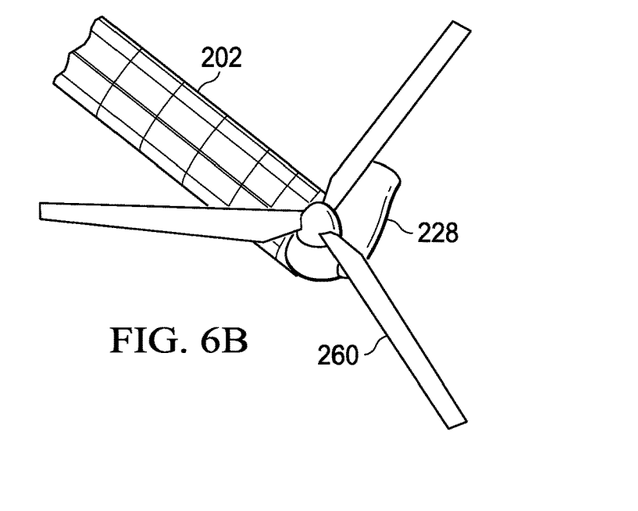
FIG. 6B shows an isometric view of the wing when the position of the spindle of the rotorcraft is in helicopter mode showing the position of the proprotor blades.

FIG. 6A shows an isometric view of the wing 202 when the position of the spindle 216 of the rotorcraft is in helicopter mode. In FIG. 6A, the tilt axis shaft 230, via gear 242, connects the output from the engine 228 to the gears (244, 248, 250) and shaft 246 within the spindle 216 that drive the proprotor input shaft 252 that connects to the proprotor. The position of the gears (234, 236, 238, 240, 244, 248, 250), and shafts (230, 232, 246) leading to proprotor input shaft 252 in relation to the engine 228, show how the rotational shaft output from the engine 228, transfers to the proprotor 260 depicted in FIG. 6B. FIG. 6B shows an external isometric view of the wing 202 when the position of the spindle 216 of the rotorcraft is in helicopter mode including proprotor 260.

Figure 7A:
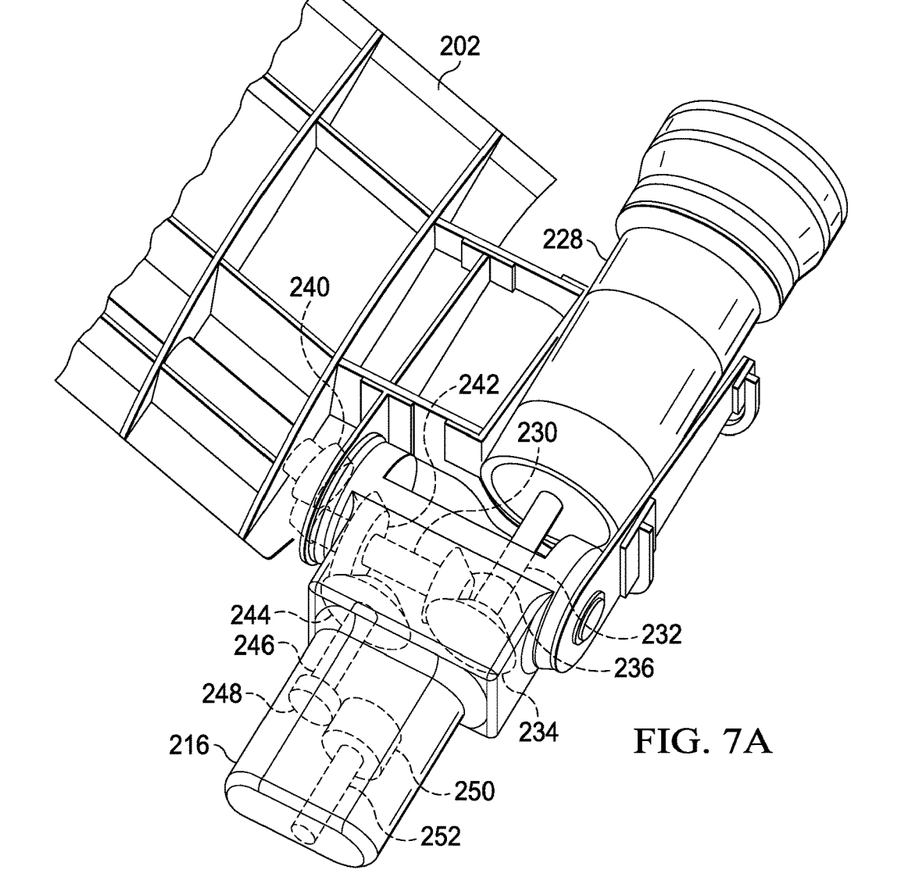
FIG. 7A shows an isometric view of the wing and the position of the spindle when the rotorcraft is in flight or cruise mode.
Figure 7B:
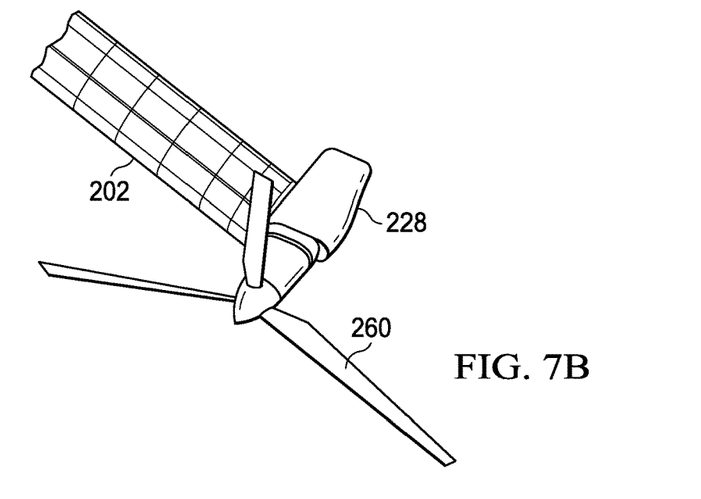
FIG. 7B shows an isometric view of the wing when the position of the spindle of the rotorcraft is in flight or cruise mode showing the position of the proprotor blades.

FIG. 7A shows two views of the wing 202 and the position of the spindle 216 when the rotorcraft is in flight or cruise mode. In FIG. 7A, the tilt axis shaft 230, via gear 242, connects the output from the engine 228 to the gears (244, 248, 250) and shaft 246 within the spindle 216 that drive the proprotor input shaft 252 that connects to the proprotor. The position of the gears (234, 236, 240, 244, 248, 250), and shafts (230, 232, 246) leading to proprotor input shaft 252 in relation to the engine 228, show how the rotational shaft output from the engine 228, transfer to the proprotor 260 depicted in FIG. 7B. FIG. 7B shows an external isometric view of the wing 202 when the position of the spindle 216 of the rotorcraft is in forward flight/cruise mode including proprotor 260.

Figure 8:
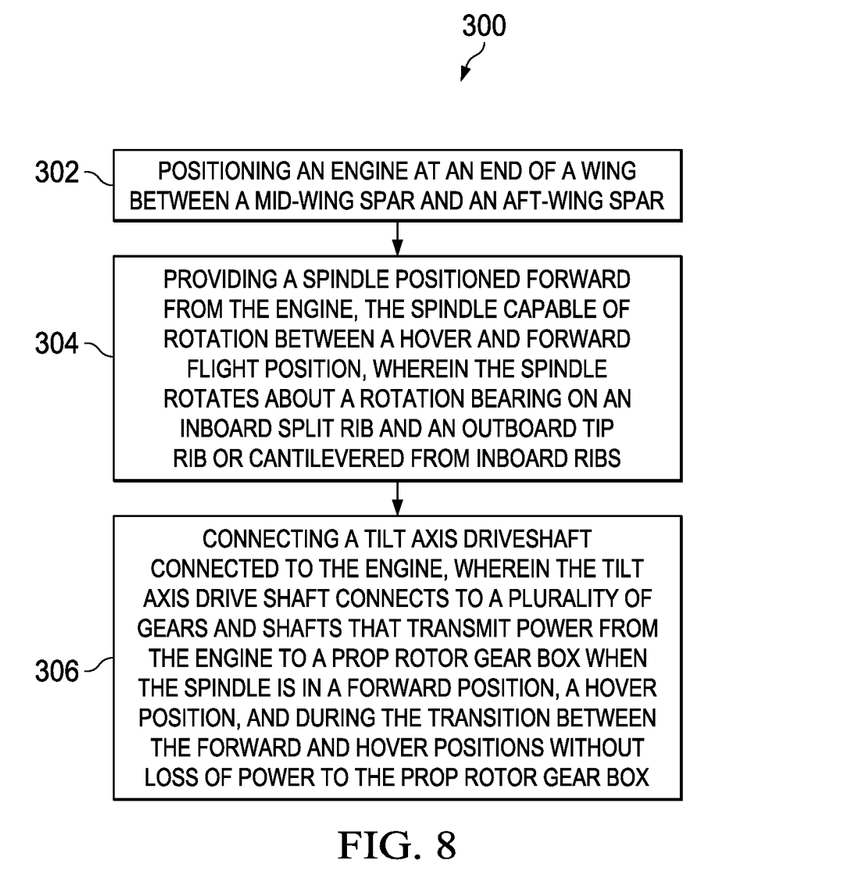
FIG. 8 shows a flowchart that shows a method transitioning a rotorcraft between a hover and forward flight mode of the present invention.

FIG. 8 is a flowchart that shows a method transitioning a rotorcraft between a hover and forward flight mode 300 that includes the steps of: (1) at step 302, positioning an engine at an end of a wing between a mid-wing spar and an aft-wing spar, (2) at step 304, providing a spindle positioned forward from the engine, the spindle capable of rotation between a hover and forward flight position, wherein the spindle rotates about a rotation bearing on an inboard split rib 212 and an outboard tip rib 214 or cantilevered from the inboard ribs; and (3) at step 306, connecting a tilt axis driveshaft connected to the engine, wherein the tilt axis drive shaft connects to a plurality of gears and shafts that transmit power from the engine to a proprotor gear box when the spindle is in a forward position, a hover position, and during the transition between the forward and hover positions without loss of power to the proprotor gear box.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft drive system comprising:
a fixed engine positioned at a wingtip of a wing member between a mid-wing spar and an aft-wing spar, wherein a center of gravity of the fixed engine is forward from the aft-wing spar;
a spindle positioned forward from the engine, the spindle capable of rotation between a hover and forward flight position, wherein the spindle rotates about a rotation bearing on an inboard split rib and an outboard tip rib or in a cantilevered spindle configuration supported by the inboard tip rib;
an interconnect drive shaft connected to the fixed engine, wherein the interconnect drive shaft passes through the wing member between a forward wing spar and a mid-wing spar of the wing member; and
a tilt axis driveshaft connected to the engine, wherein the tilt axis drive shaft connects to a plurality of gears and shafts that transmit power from the engine to a proprotor gear box when the spindle is in: a forward position, a hover position, and during a transition between the forward position and the hover position without loss of power to the proprotor gear box.

2. The rotorcraft drive system of claim 1, wherein the tilt axis driveshaft connects to the engine by a bevel gear.

3. The rotorcraft drive system of claim 1, wherein the tilt axis driveshaft connects to the gears and shafts in the spindle by a bevel gear.

4. The rotorcraft drive system of claim 1, wherein the tilt axis driveshaft further comprises a gear at an inboard end that connects to an interconnect drive shaft through a bevel gear located within the spindle, wherein the spindle is angled.

5. The rotorcraft drive system of claim 1, wherein the plurality of gears and shafts that transmit power from the engine to a proprotor gear box further comprise an aft beveled gear that connects to a shaft that transmits power to a reducer gear connected to a proprotor input shaft that connects to the proprotor gear box.

6. The rotorcraft drive system of claim 1, wherein the inboard split rib and an outboard tip rib form a cradle that supports the engine.

7. The rotorcraft drive system of claim 1, wherein the shafts are composite shafts.

8. The rotorcraft drive system of claim 1, further comprising a proprotor connected to the proprotor gearbox.

9. The rotorcraft drive system of claim 1, wherein rotation of the spindle allows structural continuity for rotor loads in the primary structure.

10. The rotorcraft drive system of claim 1, wherein the interconnect drive shaft is positioned behind the forward wing spar.

11. A method for transitioning a rotorcraft between a hover and forward flight mode comprising:
positioning a fixed engine at a wingtip of a wing between a mid-wing spar and an aft-wing spar, wherein a center of gravity of the fixed engine is forward from the aft-wing spar;
providing a spindle positioned forward from the engine, the spindle capable of rotation between a hover and forward flight position, wherein the spindle rotates about a rotation bearing on an inboard split rib and an outboard tip rib or in a cantilevered spindle configuration supported by the inboard tip rib;
positioning an interconnect drive shaft connected to the fixed engine, wherein the interconnect drive shaft passes through the wing member between a forward wing spar and a mid-wing spar of the wing member; and
connecting a tilt axis driveshaft connected to the engine, wherein the tilt axis drive shaft connects to a plurality of gears and shafts that transmit power from the engine to a proprotor gear box when the spindle is in a forward position, a hover position, and during the transition between the forward and hover positions without loss of power to the proprotor gear box.

12. The method of claim 11, further comprising connecting the tilt axis driveshaft to the engine by a bevel gear.

13. The method of claim 11, further comprising connecting the tilt axis driveshaft to the gears and shafts in the spindle by a bevel gear.

14. The method of claim 11, further comprising connecting the tilt axis driveshaft that further comprises a gear at an inboard end to an interconnect drive shaft through a bevel gear located within an angled spindle.

15. The method of claim 11, further comprising connecting the plurality of gears and shafts that transmit power from the engine to a proprotor gear box that comprise an aft beveled gear to a shaft that transmits power to a reducer gear connected to a proprotor input shaft that is connected to the proprotor gear box.

16. The method of claim 11, wherein the inboard split rib and an outboard tip rib form a cradle that supports the engine.

17. The method of claim 11, wherein the shafts are composite shafts.

18. The method of claim 11, further comprising connecting a proprotor to the proprotor gearbox.

19. The method of claim 11, wherein the rotation of the spindle allows structural continuity for rotor loads in the primary structure.

20. An aircraft comprising:
a fuselage connected to a wing member;
a fixed engine positioned at a wingtip of the wing member between a mid-wing spar and an aft-wing spar, wherein a center of gravity of the fixed engine is forward from the aft-wing spar;
a spindle positioned forward from the engine, the spindle capable of rotation between a hover and forward flight position, wherein the spindle rotates about a rotation bearing on an inboard split rib and an outboard tip rib or in a cantilevered spindle configuration supported by the inboard tip rib;
an interconnect drive shaft connected to the fixed engine, wherein the interconnect drive shaft passes through the wing member between a forward wing spar and a mid-wing spar of the wing member; and
a tilt axis driveshaft connected to the engine, wherein the tilt axis drive shaft connects to a plurality of gears and shafts that transmit power from the engine to a proprotor gear box when the spindle is in: a forward position, a hover position, and during a transition between the forward position and the hover position without loss of power to the proprotor gear box.

21. The aircraft of claim 20, wherein the tilt axis driveshaft connects to the engine by a bevel gear, connect to the gears and shafts in the spindle by a bevel gear, and connects at an inboard end with a bevel gear located within an angled spindle.

22. The aircraft of claim 20, wherein the plurality of gears and shafts that transmit power from the engine to a proprotor gear box further comprise an aft beveled gear that connects to a shaft that transmits power to a reducer gear connected to a proprotor input shaft that connects to the proprotor gear box.

23. The aircraft of claim 20, wherein the wings are swept wings.

\* \* \* \* \*